United States Patent
Yoon et al.

(10) Patent No.: US 9,746,637 B2
(45) Date of Patent: Aug. 29, 2017

(54) APPARATUS FOR COUPLING SIC REFLEX MIRROR

(71) Applicants: Si Young Yoon, Gyeonggi-do (KR); Haeng Bok Lee, Daejeon (KR)

(72) Inventors: Si Young Yoon, Gyeonggi-do (KR); Haeng Bok Lee, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 0 days.

(21) Appl. No.: 14/713,106

(22) Filed: May 15, 2015

(65) Prior Publication Data

US 2016/0121595 A1  May 5, 2016

(30) Foreign Application Priority Data

Oct. 30, 2014  (KR) .................. 10-2014-0149457

(51) Int. Cl.
  *G02B 7/183*  (2006.01)
  *G02B 7/192*  (2006.01)
  *B32B 37/14*  (2006.01)

(52) U.S. Cl.
  CPC ............ *G02B 7/183* (2013.01); *G02B 7/192* (2013.01); *B32B 37/144* (2013.01); *B32B 2307/51* (2013.01); *B32B 2307/56* (2013.01)

(58) Field of Classification Search
  CPC ............ B32B 2551/08; B32B 2551/00; B32B 2307/51; B32B 2307/56; B32B 2307/732; B32B 2307/734; B32B 37/144; G02B 7/18; G02B 7/182; G02B 7/1822;
(Continued)

(56) References Cited

U.S. PATENT DOCUMENTS

| 5,054,682 A | * | 10/1991 | Mistry | ............... B23K 20/16 228/124.1 |
| 2002/0163776 A1 | * | 11/2002 | Thompson | ............ G06F 1/1601 361/679.21 |

(Continued)

FOREIGN PATENT DOCUMENTS

JP          11030709 A  *  2/1999

OTHER PUBLICATIONS

Machine translation of JP11030709, Feb. 1999.*

*Primary Examiner* — Philip Tucker
*Assistant Examiner* — Jimmy R Smith, Jr.
(74) *Attorney, Agent, or Firm* — Ostrolenk Faber LLP

(57) ABSTRACT

Disclosed is an apparatus for coupling an SiC reflex mirror, configured to mount an SiC reflex mirror formed on a plurality of points and having a cylindrical portion on one surface thereof, to a mounting plate. The apparatus includes: an insertion portion having a vertical portion having a curved shape and attached to inside of the cylindrical portion, and a horizontal portion integrally formed with the vertical portion and formed to cross the vertical portion; an adhesive provided between the vertical portion and an inner circumferential surface of the cylindrical portion, and configured to attach the insertion portion to the cylindrical portion; a fixing portion having one end fixed to the horizontal portion, having another end fixed to the mounting plate, and configured to fix the SiC reflex mirror to the mounting plate; and a coupling member configured to fix the fixing portion to the insertion portion.

8 Claims, 5 Drawing Sheets

(58) Field of Classification Search
CPC ...... G02B 7/1824; G02B 7/183; G02B 7/181;
G02B 7/192; G02B 7/198; G03B 19/12
USPC .......................................................... 29/428
See application file for complete search history.

(56) References Cited

U.S. PATENT DOCUMENTS

2004/0246610 A1* 12/2004 Tsuno ...................... G02B 5/08
359/883
2010/0202071 A1* 8/2010 Preumont .............. G02B 26/06
359/849
2015/0077874 A1* 3/2015 Naepflin .............. G02B 7/1822
359/872

* cited by examiner

APPARATUS FOR COUPLING SIC REFLEX MIRROR

CROSS-REFERENCE TO RELATED APPLICATION

Pursuant to 35 U.S.C. §119(a), this application claims the benefit of earlier filing date and right of priority to Korean Application No. 10-2014-0149457, filed on Oct. 30, 2014, the contents of which is incorporated by reference herein in its entirety.

BACKGROUND OF THE INVENTION

1. Field of the Invention

This specification relates to an apparatus for coupling a reflex mirror, and more particularly, to an apparatus for coupling a reflex mirror using an adhesive when mounting, as technology applied to mount a reflex mirror in a reflecting optical system of a large aperture.

2. Background of the Invention

In the conventional art, a reflex mirror formed of a material having a small thermal expansion such as Zerodur is assembled by being directly adhered to a mirror fixation device (MFD) formed of Invar. In this case, the following characteristics may be revealed.

Firstly, if thermal expansion coefficients of the reflex mirror and the MFD are different from each other, when temperature rising or temperature fall from a refining temperature occurs, deformation of the MFD due to the difference in the thermal expansion coefficients is transmitted to the reflex mirror, thereby degrading an optical performance. Such a phenomenon emerges even when deformation of several nm occurs. Further, when mounting the MFD to the reflex mirror, assembly processes become difficult due to a complicated shape of the MFD. An adhesion thickness, filling an adhesive in an adhesion part, and a precise adhesion position are important. Therefore, an adhesion shape is required to be simpler.

In the conventional art, when mounting the MFD to the aforementioned reflex mirror, the following problems may be caused.

Firstly, a stress is generated due to a difference in thermal expansion coefficients between the reflex mirror and the MFD. The stress is more increased as an adhesion surface has a longer length. A difference in contraction or expansion of the adhesion surface causes a curved shape of the reflex mirror.

Secondly, adhesion processes become difficult due to a low workability to mount the MFD to the reflex mirror (SiC reflex mirror). That is, it is difficult to fill an adhesive in the adhesion surface, and to control an adhesive thickness (generally, 0.05~0.2 mm) and an adhesion position accuracy (direction, angle, position, thickness deviation).

SUMMARY OF THE INVENTION

Therefore, an aspect of the detailed description is to provide an apparatus for coupling an SiC reflex mirror, capable of minimizing thermal deformation during an assembly process, by inserting an insert structure having the same material as the reflex mirror, into the reflex mirror.

To achieve these and other advantages and in accordance with the purpose of this specification, as embodied and broadly described herein, there is provided an apparatus for coupling an SiC reflex mirror, configured to mount an SiC reflex mirror formed on a plurality of points and having a cylindrical portion on one surface thereof, to a mounting plate, the apparatus including: an insertion portion having a vertical portion having a curved shape and attached to inside of the cylindrical portion, and a horizontal portion integrally formed with the vertical portion and formed to cross the vertical portion; an adhesive provided between the vertical portion and an inner circumferential surface of the cylindrical portion, and configured to attach the insertion portion to the cylindrical portion; a fixing portion having one end fixed to the horizontal portion, having another end fixed to the mounting plate, and configured to fix the SiC reflex mirror to the mounting plate; and a coupling member configured to fix the fixing portion to the insertion portion. The fixing portion may include: a bi-pod coupled to the mounting plate; a body to which the bi-pod is insertion-fixed partially or wholly; and a mounting portion extending from the body, and having a larger sectional area than the body. The coupling member may be formed to pass through the mounting portion and the horizontal portion.

The apparatus may further include a washer disposed between the coupling member and the mounting portion. The insertion portion may be formed of an SiC material, and a soft metallic thin film formed of titanium (Ti) may be disposed between the horizontal portion and the mounting portion.

The apparatus may further include a nut plate disposed to face the mounting portion by crossing the horizontal portion, and coupled to the coupling member. A through hole for passing the coupling member therethrough may be formed at the horizontal portion, and a screw thread may be formed at the nut plate, such that the coupling member and the nut plate are coupled to each other.

The horizontal portion may be provided with a through hole for passing the coupling member therethrough, and a screw thread may be formed at the through hole so as to be coupled with the coupling member.

The nut plate may be integrally formed with the insertion portion.

The present invention can have the following advantages.

Firstly, since an assembly deformation, a thermal deformation, etc. of the reflex mirror are minimized by the insertion portion (SiC insert), a precise performance of the apparatus can be maintained.

Secondly, an adhesion accuracy can be enhanced, an adhesion strength can be maximized, and incomplete factors such as inner pores can be removed by facilitated assembly processes. Further, a difference in thermal expansion coefficients between different materials (i.e., the SiC reflex mirror and a mirror fixation device (MFD)) can be reduced.

Thirdly, deformation of the SiC reflex mirror (SiC structure) due to a coupling force of the coupling member can be attenuated by using the insertion portion (SiC insert) and the adhesive.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
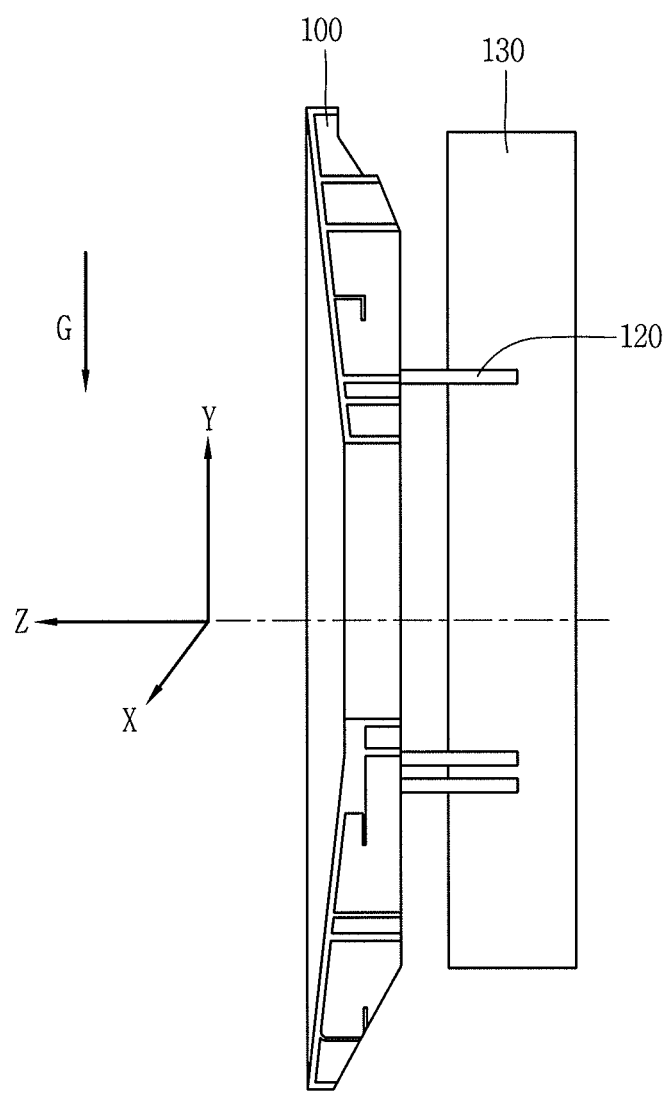
FIG. 1 is a sectional view illustrating a mounting structure of an SiC reflex mirror according to an embodiment of the present invention.

FIG. 1 is a sectional view illustrating a mounting structure of an SiC reflex mirror 100 according to an embodiment of the present invention.

Figure 4:
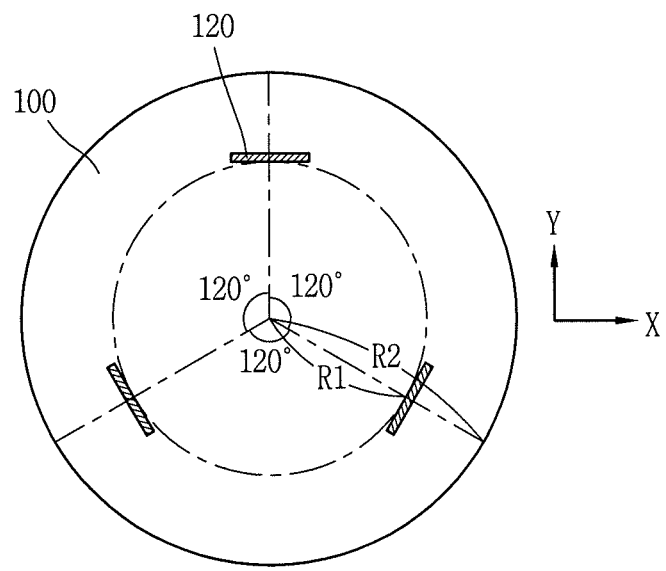
FIG. 4 is a view illustrating an MFD mounting direction according to an embodiment of the present invention.

Referring to FIG. 1, the SiC reflex mirror 100 is mounted to a mounting plate 130 vertically-disposed (optical bench). In order to prevent the SiC reflex mirror 100 from being deformed toward a gravitational direction (G) by gravity, the SiC reflex mirror 100 should be fixed stably. For this, the SiC reflex mirror 100 is generally fixed by a mirror fixation device (MFD) 120. As shown in FIG. 4, the MFD 120 is fixed in the SiC reflex mirror 100 at three positions. The MFD 120 is arranged to form an equilateral triangle based on a center of the SiC reflex mirror 100.

Figure 2:
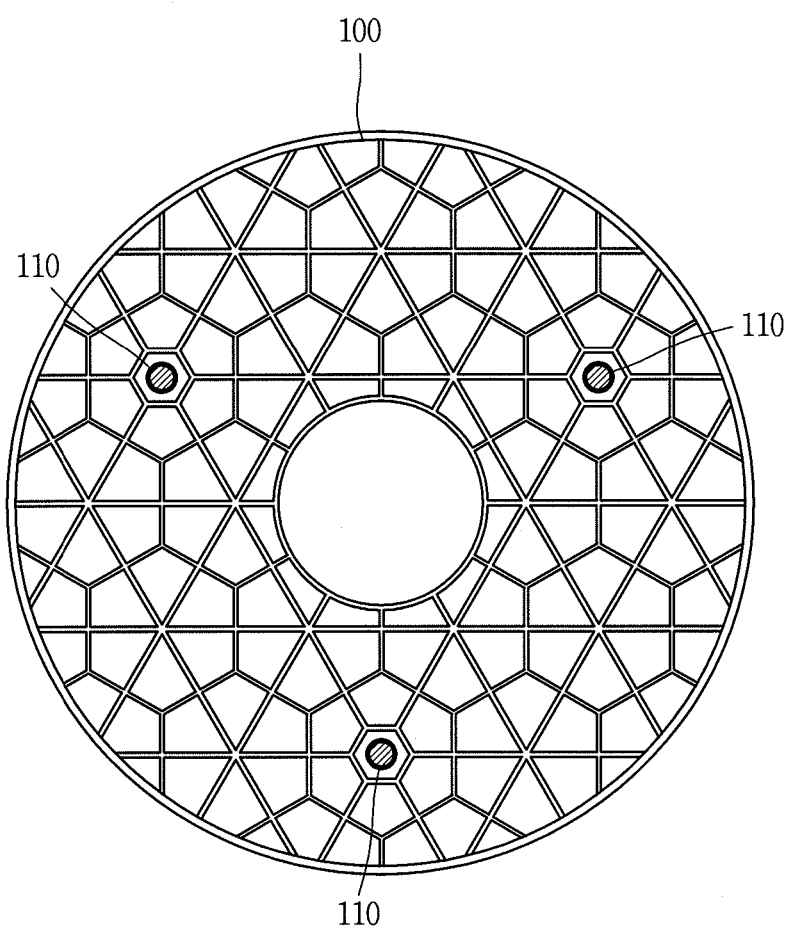
FIG. 2 is a view illustrating three supporting points of an SiC reflex mirror according to an embodiment of the present invention.
Figure 3:
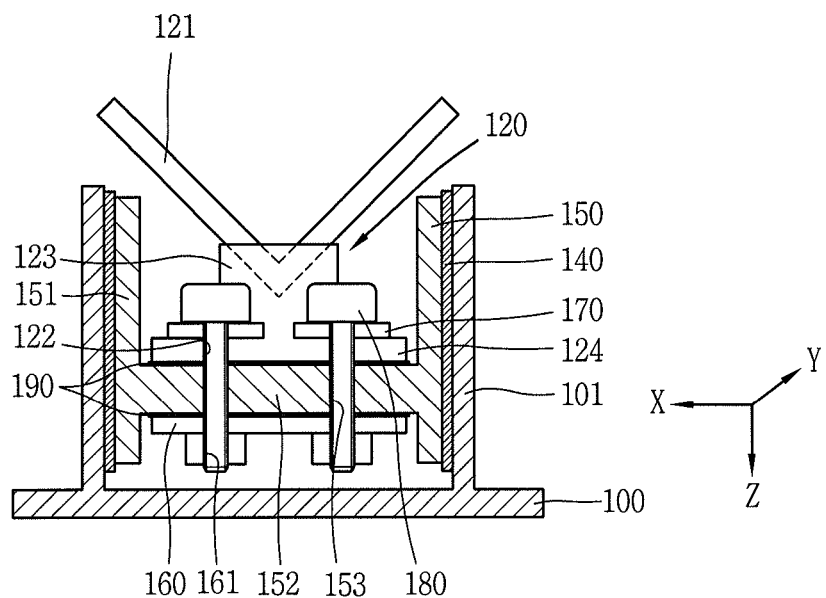
FIG. 3 is a sectional view of an apparatus for coupling an SiC reflex mirror according to an embodiment of the present invention.

That is, the SiC reflex mirror 100 having a light weight structure in a reflecting optical system of a large aperture is generally mounted by using three supporting points 110, as shown in FIG. 2. The three supporting points 110 is supported by the MFD 120 having an optimum degree of freedom. The supporting points 110 should have functions to determine a position of the SiC reflex mirror 100, to support a load of the SiC reflex mirror 100, and to prevent a thermal deformation and a structural deformation of the mounting plate 130 where the SiC reflex mirror 100 has been mounted. Further, the MED 120 should be fixed to the mounting plate 130 on a proper position. Referring to FIG. 1, G denotes a gravitational direction, X and Y denote formation directions of the SiC reflex mirror 100, and Z denotes a thickness direction of the SiC reflex mirror 100.

According to an embodiment of the present invention, an apparatus for coupling an SiC reflex mirror 100 formed on a plurality of points and having a cylindrical portion 101 on one surface thereof, to a mounting plate 130 includes an insertion portion 150 having a vertical portion 151 having a curved shape and attached to inside of the cylindrical portion 101, and a horizontal portion 152 integrally formed with the vertical portion 151 and formed to cross the vertical portion 151; an adhesive 140 provided between the vertical portion 151 and an inner circumferential surface of the cylindrical portion 101, and configured to attach the insertion portion 150 to the cylindrical portion 101; a fixing portion 120 having one end fixed to the horizontal portion 152, having another end fixed to the mounting plate 130, and configured to fix the SiC reflex mirror 100 to the mounting plate 130; and a coupling member 180 configured to fix the fixing portion 120 to the insertion portion 150.

That is, the vertical portion 151 has a hollow cylindrical shape, and inside of the vertical portion 151 is connected to the horizontal portion 152 to thus be supported thereby. The insertion portion 150 has an approximate 'H' shape.

Figure 5:
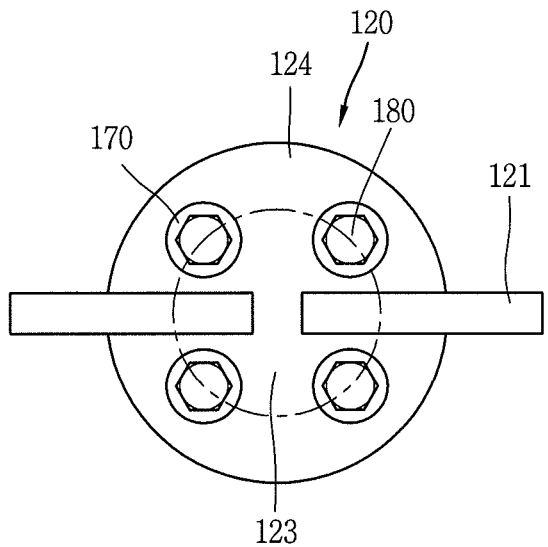
FIG. 5 is a top view of a fixing portion according to an embodiment of the present invention.

The fixing portion 120 according to an embodiment of the present invention includes a bi-pod 121 coupled to the mounting plate 130, a body 123 to which the bi-pod 121 is fixed, and a mounting portion 124 extending from the body 123 and having a larger sectional area than the body 123. The bi-pod 121 has a 'V'-shape, and is fixed as at least part thereof is inserted into the body 123 as shown in FIG. 5. The coupling member 180 may be formed at 4 positions.

Figure 6:
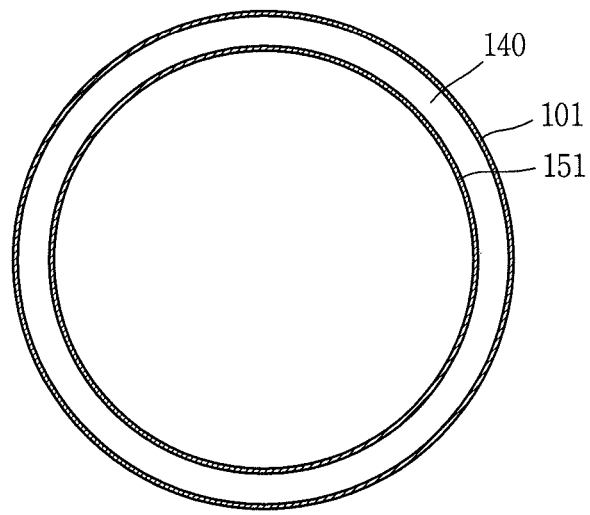
FIG. 6 is a sectional view illustrating an adhered state between a cylindrical portion of a reflex mirror and an insertion portion (SiC insert) according to an embodiment of the present invention.

In an embodiment, the adhesive 140 is provided between the cylindrical portion 101 of the SiC reflex mirror 100, and the insertion portion 150 (SiC insert). FIG. 6 illustrates that the cylindrical portion 101 of the SiC reflex mirror 100 is adhered to the insertion portion 150 by the adhesive 140. Preferably, the adhesive 140 is filled between the cylindrical portion 101 and the insertion portion 150 without a gap. As shown in FIG. 4, the MFD 120 may be arranged at intervals of 120° based on a center of the SiC reflex mirror 100. Under an assumption that a radius of the SiC reflex mirror 100 is 'R2', the MFD 120 is arranged at points each having a radius 'R1' from the center of the SiC reflex mirror 100.

A washer 170 for distribution of stress is provided between the coupling member 180 and the horizontal portion 152. The insertion portion 150 is formed of SiC, in order to minimize a difference in thermal expansion coefficients between itself and the SiC reflex mirror 100.

A soft metallic thin film 190 is disposed between the horizontal portion 152 and the mounting portion 124. The soft metallic thin film 190 may be disposed between a nut plate 160 to be explained later and the horizontal portion 152 in a first embodiment.

In the first embodiment, the nut plate 160 is disposed under the horizontal portion 152. The nut plate 160 is disposed to face the fixing portion 120 by crossing the horizontal portion 152, thereby being coupled to the coupling member 180. The nut plate 160 may be coupled to a plurality of coupling members 180. For instance, as shown in FIG. 5, the nut plate 160 may be coupled to 4 coupling members 180.

That is, in the first embodiment, the apparatus for coupling the SiC reflex mirror 100 includes the nut plate 160 mounted to the insertion portion 150 formed of an SiC material (SiC insert), the adhesive 140, the fixing portion 120, the coupling member 180 (bolt), the soft metallic thin film 190 (metal sheet), and the mounting plate 130.

In the first embodiment, the insertion portion 150 formed of an SiC material is adhered to the SiC reflex mirror 100 by using the adhesive 140. Then, the insertion portion 150 is hardened to have an adhesion strength. The nut plate 160 is pre-mounted to the insertion portion 150 (SiC insert), so as to be coupled with the coupling member 180 during an assembly process. The fixing portion 120 is mounted to the insertion portion 150 by 4 coupling members 180 (bolts). In this case, the Ti metallic thin film 190 and so on are fitted into an SiC surface to remove a partial stress.

In the first embodiment, a through hole 153 is formed at the horizontal portion 152 such that the coupling member 180 passes therethrough. A screw thread may not be formed at the through hole 153, and a screw thread 161 is formed at the nut plate 160 so that only the nut plate 160 can be coupled to the coupling member 180. A through hole 122 is formed at the mounting portion 124, and a screw thread may not be formed at the through hole 122.

Figure 7:
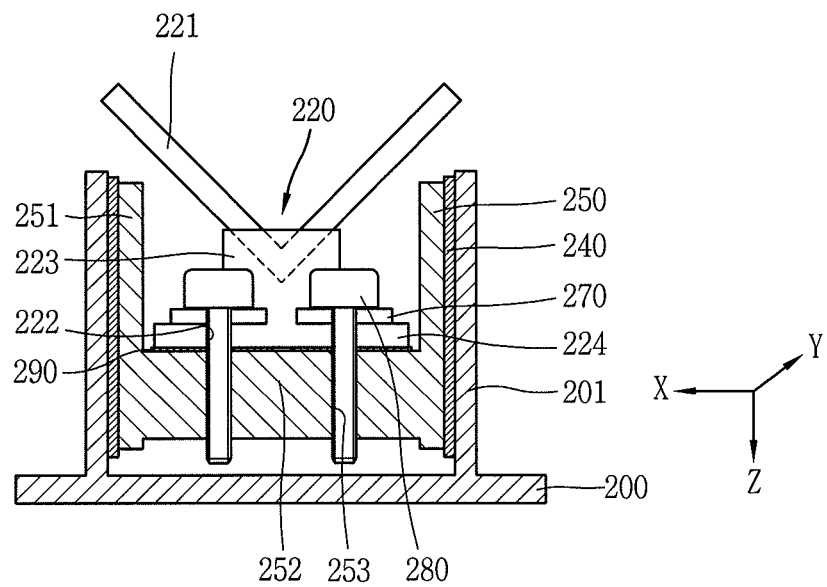
FIGS. 7 and 8 are sectional views of an apparatus for coupling a reflex mirror according to another embodiment of the present invention.
Figure 8:
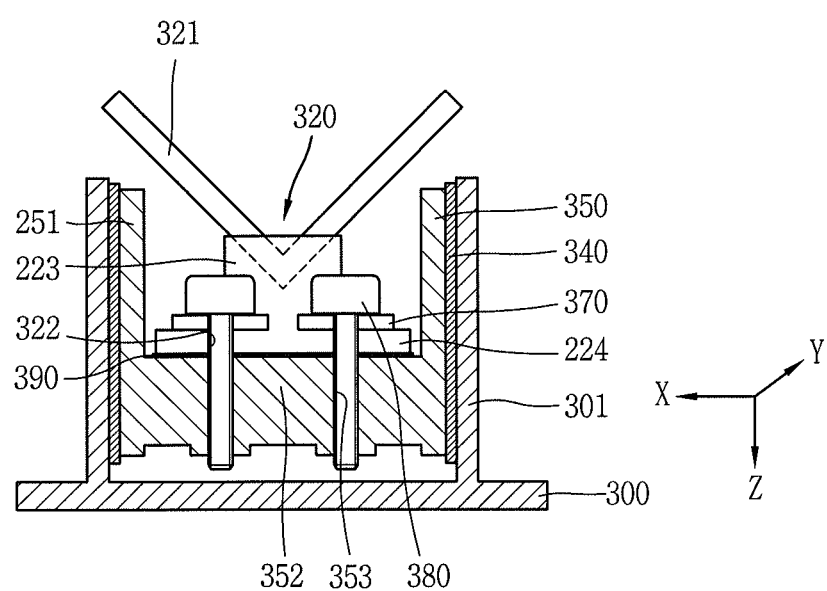

FIGS. 7 and 8 are sectional views of an apparatus for coupling the reflex mirror 100 according to a second embodiment and a third embodiment of the present invention, respectively. The second and third embodiments are almost the same as the first embodiment, and thus the same configuration will not be explained. Similar or the same configuration will be provided with similar or the same reference numerals.

In the first embodiment, the nut plate 160 is disposed under the horizontal portion 152, and the fixing portion 120 is fixed to the insertion portion 150 as the nut plate 160 is coupled to the coupling member 180. On the other hand, in the second embodiment, the nut plate 160 is not provided, and a screw thread is formed on an inner circumferential surface of a through hole 253 for passing a coupling member 280 of a horizontal portion 252 therethrough. As the screw thread is formed on the inner circumferential surface of the through hole 253, the coupling member 280 and the horizontal portion 252 may be coupled to each other.

In the third embodiment, the nut plate 160 of the first embodiment is integrally formed with an insertion portion 350. That is, referring to FIG. 8, a screw thread is formed at a lower end of a through hole 353 of a horizontal portion 352, such that the nut plate 160 is coupled to a coupling member 380.

In this case, a screw thread may be formed on an entire part of the through hole 353 of the horizontal portion 352.

Hereinafter, processes to mount the fixing portion 120 of the first embodiment to the insertion portion 150 (SiC insert), and effects thereof will be explained.

The fixing portion 120, a component for mounting the SiC reflex mirror 100 to the mounting portion 130, serves to fix the SiC reflex mirror 100 to a designed position in environments of transportation, treatment, launch and operation. Further, the fixing portion 120 is designed to perform minimum restrictions such that a thermal deformation and a structural deformation of the mounting plate 130 do not cause a surface deformation of the SiC reflex mirror 100. Since intensity of the fixing portion 120 (6 degree of freedom (DOF)) should be controlled, as shown in FIG. 4, the fixing portion 120 is mounted in a symmetrical manner based on a shaft. The fixing portion 120 is mounted to provide a lowest intensity (Flex) in a radial direction, and to provide a highest intensity (Stiff) in a tangential direction.

A supporting force applied to the SiC reflex mirror 100 is transferred to the insertion portion 150 (SiC insert) and the adhesive 140 through the coupling member 180, thereby supporting the SiC reflex mirror 100. In this case, a stress is generated from all paths to which the supporting force is transferred.

The fixing portion 120 has a Bi-POD shape, a thin and long shape, which is not proper to be adhered to a cylindrical deep adhesion surface. Thus, the insertion portion 150 (SiC insert) according to one embodiment of the present invention is formed to have a cylindrical shape for enhanced workability. The adhesive 140 is applied to an inner surface of the cylindrical portion 101, an adhesion part of the SiC reflex mirror 100. Next, the insertion portion 150 of a cylindrical shape is inserted into the SiC reflex mirror 100 by using a tool, and then is hardened. The insertion portion 150 should be precisely inserted into a central part of the cylindrical portion 101 of the SiC reflex mirror 100, for a sufficient strength of the adhesive 140 and an enhanced assembly precision. Through such processes, assembly processes may be simplified.

In the first embodiment, deformation of different materials due to thermal expansion by temperature change can be attenuated.

Generally, the SiC reflex mirror 100 is formed of a ceramic material such as glass or SiC, and the fixing portion 120 is formed of Invar, Ti alloy, etc. Preferably, different materials having a small difference in thermal expansion coefficients (CTE) are selected. However, a difference in thermal expansion coefficients (CTE) is always generated within an operating temperature range and a durability temperature range in an optical system. In the first embodiment, the insertion portion 150 is formed of the same material as the SiC reflex mirror 100, in order to minimize deformation transfer to a surface of the SiC reflex mirror 100, the deformation resulting from a difference in thermal expansion between the insertion portion 150 and the fixing portion 120.

Further, in the first embodiment, stress transfer due to a coupling force can be attenuated.

In the aforementioned structure, the fixing portion 120 is mounted by using the coupling member 180. In this case, a coupling force of the coupling member 180 causes deformation of the insertion portion 150. Such a stress distribution is attenuated by ductility (softness) of the adhesive 140 at an interface with the adhesive 140. In the first embodiment, epoxy is used as the adhesive 140. Young's modulus of epoxy (E_ep) is 0.34 GPa, whereas young's modulus of SiC (E_SiC) is 430 GPa. Since the difference in the young's modulus is more than 1200 times, the adhesive 140 can perform an attenuation function.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for coupling a SiC reflex mirror, configured to mount a SiC reflex mirror having a cylindrical portion formed on each of a plurality of points on a rear surface thereof, to a mounting plate, the apparatus comprising:
an insertion portion having a vertical portion having a curved shape or a hollow cylindrical shape and attached to inside of the cylindrical portion, and a horizontal portion integrally formed with the vertical portion and formed to cross the vertical portion;
an adhesive provided at at least one of an outer surface of the vertical portion and an inner circumferential surface of the cylindrical portion, and configured to attach the insertion portion spaced apart from the cylindrical portion reflex mirror;
a fixing portion provided at the mounting plate and having one end fixed to the horizontal portion with a region of fixation apart from the SiC reflex mirror, having another end fixed to the mounting plate, and configured to fix the SiC reflex mirror to the mounting plate in a state that the fixing portion does not reach the SiC reflex mirror by the insertion portion and the adhesive; and
a coupling member configured to fix the fixing portion to the insertion portion,
wherein the insertion portion is formed of a SiC material to prevent a deformation caused by a difference in thermal expansion coefficients between the SiC reflex mirror and the fixing portion,
wherein the fixing portion includes:
a bi-pod coupled to the mounting plate;
a body to which the bi-pod is insertion-fixed partially or wholly; and
a mounting portion extending from the body, and having a larger sectional area than the body,
wherein the coupling member is formed to pass through the mounting portion and the horizontal portion,
wherein the cylindrical portion of the reflex mirror and the fixing portion of the mounting plate are arranged to form an equilateral triangle based on a center of the SiC reflex mirror, respectively, and
wherein Young' modulus of the adhesive is less than Young's modulus of the SiC material so that stress transfer due to the coupling force of the coupling member is attenuated by ductility of the adhesive.

2. The apparatus of claim 1, further comprising a washer disposed between the coupling member and the mounting portion.

3. The apparatus of claim 1, wherein a soft metallic thin film formed of titanium is disposed between the horizontal portion and the mounting portion.

4. The apparatus of claim 1, further comprising a nut plate disposed to face the mounting portion by crossing the horizontal portion, and coupled to the coupling member.

5. The apparatus of claim 4, wherein a through hole for passing the coupling member therethrough is formed at the horizontal portion, and a screw thread is formed at the nut plate, such that the coupling member and the nut plate are coupled to each other.

6. The apparatus of claim 4, wherein the nut plate is integrally formed with the insertion portion.

7. The apparatus of claim 1, wherein the horizontal portion is provided with a through hole for passing the coupling member therethrough, and a screw thread is formed at the through hole so as to be coupled with the coupling member.

8. The apparatus of claim 1, wherein the adhesive is made of an epoxy material.

* * * * *